United States Patent
Yu et al.

(10) Patent No.: US 11,699,796 B1
(45) Date of Patent: Jul. 11, 2023

(54) METHOD FOR RECYCLING HYDROGEN FUEL CELL OF NEW ENERGY VEHICLE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Ting Peng, Guangdong (CN); Yinghao Xie, Guangdong (CN); Xuemei Zhang, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunana (CN)

( * ) Notice: Subject to any disclaimer, the term of this patent is extended or adjusted under 35 U.S.C. 154(b) by 0 days.

(21) Appl. No.: 18/004,042

(22) PCT Filed: Apr. 30, 2021

(86) PCT No.: PCT/CN2021/091559
§ 371 (c)(1),
(2) Date: Dec. 30, 2022

(87) PCT Pub. No.: WO2022/001351
PCT Pub. Date: Jan. 6, 2022

(30) Foreign Application Priority Data

Jul. 3, 2020 (CN) .......................... 202010637420.6

(51) Int. Cl.
*H01M 8/00* (2016.01)
*H01M 8/008* (2016.01)
(Continued)

(52) U.S. Cl.
CPC ............. *H01M 8/008* (2013.01); *C22B 7/007* (2013.01); *C22B 11/046* (2013.01)

(58) Field of Classification Search
CPC ...... H01M 8/008; H01M 8/02; H01M 8/0202; H01M 8/0206; Y02E 60/50
See application file for complete search history.

(56) References Cited

FOREIGN PATENT DOCUMENTS

| CN | 101036889 A | 9/2007 |
|---|---|---|
| CN | 101080834 A | 11/2007 |

(Continued)

OTHER PUBLICATIONS

Shin et al., Method of Preparing Platinum Catalyst Supported on Carbon Black for Fuel Cell Using a Recycled Platinum From Spent Catalyst. See the Abstract. (Year: 2014).*

(Continued)

*Primary Examiner* — Cynthia H Kelly
*Assistant Examiner* — Monique M Wills
(74) *Attorney, Agent, or Firm* — Buchalter; Jason W. Croft

(57) ABSTRACT

Disclosed is a method for recycling a hydrogen fuel cell of a new energy vehicle, including the following steps of: (1) discharging and disassembling a hydrogen fuel cell in turn to obtain a hydrogen supply system, an air supply system, a cooling system and a galvanic pile; (2) disassembling the galvanic pile into a catalyst and carbon cloth, and ashing to obtain ash; (3) adding an auxiliary agent into the ash, mixing, introducing inert gas, heating, introducing oxidizing gas, and absorbing tail gas by using an ammonium salt solution; and (4) adding a reducing agent into the ammo- (Continued)

nium salt solution absorbing the tail gas in step (3) to react, filtering, taking and cleaning a filter residue to obtain Pt.

9 Claims, 1 Drawing Sheet

(51) Int. Cl.
*C22B 11/00* (2006.01)
*C22B 7/00* (2006.01)

(56) References Cited

FOREIGN PATENT DOCUMENTS

| | | | | |
|---|---|---|---|---|
| CN | 101094928 | A | 12/2007 | |
| CN | 101280362 | A * | 10/2008 | ............... B09B 3/00 |
| CN | 101280362 | A | 10/2008 | |
| CN | 101347788 | A | 1/2009 | |
| CN | 106536766 | A | 3/2017 | |
| CN | 106803596 | A | 6/2017 | |
| CN | 107497420 | A | 12/2017 | |
| CN | 109088080 | A | 12/2018 | |
| CN | 111900425 | A | 11/2020 | |
| CN | 111900425 | B | 12/2021 | |
| JP | S63166937 | A | 7/1988 | |
| JP | S63210246 | A | 8/1988 | |
| JP | H02301527 | A | 12/1990 | |
| JP | 2002212650 | A | 7/2002 | |
| KR | 101452809 | B1 * | 10/2014 | ............... B09B 3/00 |
| WO | 2008099747 | A1 | 8/2008 | |

OTHER PUBLICATIONS

International Search Report and Written Opinion for PCT/CN2021/091559 dated Jul. 15, 2021.
First Search in Chinese Application No. CN2020106374206 dated Mar. 28, 2021.
Supplementary Search in Chinese Application No. CN2020106374206 dated Sep. 13, 2021.
First Office Action in Chinese Application No. CN2020106374206 dated Apr. 6, 2021.

* cited by examiner

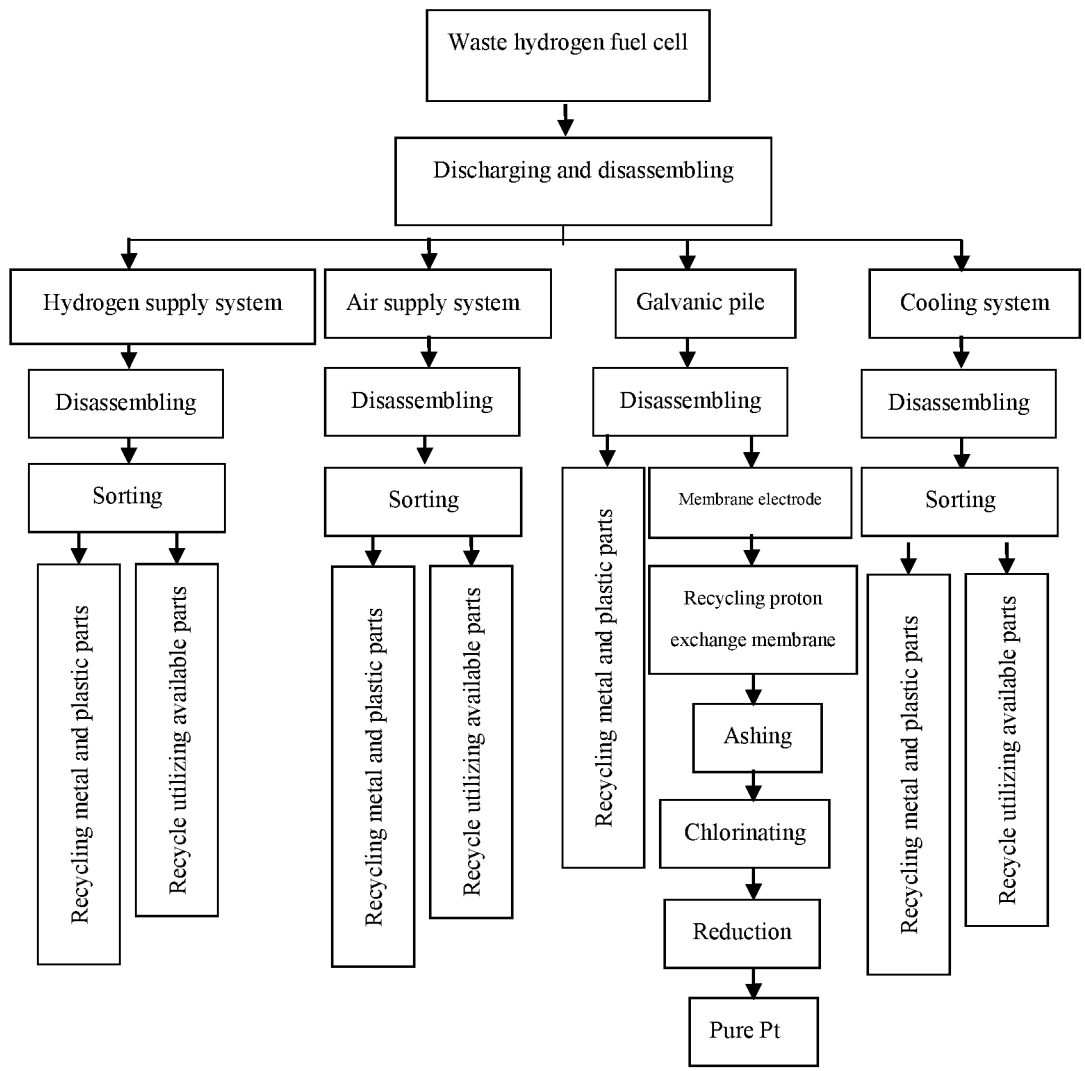

METHOD FOR RECYCLING HYDROGEN FUEL CELL OF NEW ENERGY VEHICLE

CROSS-REFERENCE TO RELATED APPLICATION

This application is a national stage filing under 35 U.S.C. § 371 of international application number PCT/CN2021/091559, filed Apr. 30, 2021, which claims priority to Chinese patent application No. 202010637420.6, filed Jul. 3, 2020. The contents of these applications are incorporated herein by reference in their entirety.

TECHNICAL FIELD

The present invention relates to the field of recycling hydrogen fuel cells, and more particularly, to a method for recycling a hydrogen fuel cell of a new energy vehicle.

BACKGROUND

A fuel cell has no pollution to the environment. Electrochemical reaction rather than combustion (gasoline and diesel) or energy storage (storage battery) which is the most typical traditional backup power solution that will release pollutants such as $CO_X$, $NO_X$, $SO_X$ gas and dust while combustion, is employed in the fuel cell. As mentioned above, the fuel cell only generates water and heat. If hydrogen is generated by renewable energy sources (photovoltaic panels, wind power generation, or the like), the whole cycle is a process that does not produce harmful substances completely. According to Energy Storage International Summit, as a clean energy source with zero emissions in the true sense, the application of hydrogen fuel cells in developed countries is accelerating. The fuel cell has gone from laboratory to industrialization. Compared with a lithium battery, it has the advantage of zero pollution.

However, with the continuous and extensive use of the hydrogen fuel cells, the end of life of some old hydrogen fuel cells is approaching, and there are a large number of high-value components in the hydrogen fuel cells, such as various valves and gas pipelines, valuable metal wastes, precious metal platinum in catalysts, and the like. The availability of these high-value wastes makes recycling significant. At present, the recycling of precious metal platinum in catalysts may be summarized as carbonyl platinum chloride method, molten salt electrolysis method, zone smelting method, ammonium chloride repeated precipitation method, sodium bromate hydrolysis method, oxidized carrier hydrolysis method, and the like. The carbonyl platinum chloride method and the molten salt electrolysis method are limited to large-scale production and application due to complicated technological processes and tedious operations thereof. The sodium bromate hydrolysis method and the oxidized carrier hydrolysis method have a large amount of solution treatment and need a long time to stand and clarify, which takes up space and site, has a long generation period, and cannot be applied to large-scale production. Therefore, the existing recycling processes have the defects of high labor intensity, low production efficiency, inconvenient operation and high energy consumption.

SUMMARY

The object of the present invention is to provide a method for recycling a hydrogen fuel cell of a new energy vehicle. According to the method, a platinum element in the hydrogen fuel cell can be efficiently recycled, high-purity Pt can be prepared by combining a chlorination evaporation method with a chemical reduction method, precious metal resources are effectively saved, and the recycling process has the advantages of being easy and convenient to operate and high in production efficiency.

To implement the foregoing object, the present invention employs the following technical solutions.

A method for recycling a hydrogen fuel cell of a new energy vehicle includes the following steps of:

(1) discharging and disassembling a hydrogen fuel cell to obtain a hydrogen supply system, an air supply system, a cooling system and a galvanic pile;

(2) disassembling the galvanic pile into a catalyst and carbon cloth, and ashing to obtain ash;

(3) adding an auxiliary agent into the ash, mixing, introducing inert gas, heating, introducing oxidizing gas, and absorbing tail gas by using an ammonium salt solution; and (4) adding a reducing agent into the ammonium salt solution absorbing the tail gas in step (3) to react, filtering, taking and cleaning a filter residue to obtain Pt.

Preferably, in step (1), the specific treatment process of the hydrogen supply system refers to: further disassembling the hydrogen supply system to obtain a hydrogen ejector, a high-pressure hydrogen sealing valve, a reducing valve, a hydrogen tank, a hydrogen circulating pump, an inverter, a hydrogen concentration sensor, a hydrogen temperature sensor, a hydrogenation control unit, a hydrogen pressure sensor, and a hydrogen pipeline.

In the process of discharging in step (1), sealing performances of the high-pressure hydrogen sealing valve, the reducing valve and the hydrogen tank are checked. If there is no air leakage, the high-pressure hydrogen sealing valve, the reducing valve and the hydrogen pipeline are recycled as old parts for repeated utilization. If the hydrogen tank has good sealing performance and is within a service life thereof, the hydrogen tank is recycled for repeated utilization. If the sealing performances of the high-pressure hydrogen sealing valve, the pressure reducing valve, the hydrogen tank and the hydrogen pipeline are not good, the high-pressure hydrogen sealing valve, the pressure reducing valve, the hydrogen tank and the hydrogen pipeline will be directly recycled as waste metal materials. If the hydrogen ejector, the hydrogen circulating pump and the inverter operate normally in the discharging process in step (1), the hydrogen ejector, the hydrogen circulating pump and the inverter will be recycled for repeated utilization; otherwise, the hydrogen ejector, the hydrogen circulating pump and the inverter will be further disassembled and classified according to the material categories and recycled. The hydrogen concentration sensor, the hydrogen temperature sensor, the hydrogenation control unit and the hydrogen pressure sensor are directly disassembled and classified according to the material categories and recycled.

Preferably, in step (1), the specific treatment process of the air supply system refers to: further disassembling the air supply system to obtain an air compressor, a muffler, an air valve module, and an air pipeline.

The air compressor and the muffler will be recycled for repeated utilization if the air compressor and the muffler operate normally in the discharging process described in (1). The air valve module and the air pipeline will be recycled for repeated utilization if there is no air leakage in the discharging process mentioned in (1), otherwise, the air valve module and the air pipeline will be recycled as waste metal materials.

Preferably, in step (1), the specific treatment process of the cooling system refers to: further disassembling the cooling system to obtain a water pump, a radiator, a deionization device, and a thermostat (three-way valve).

If the water pump, the radiator, the deionization device, and the thermostat operate normally in the discharging process in step (1), the water pump, the radiator, the deionization device, and the thermostat will be recycled for repeated utilization; otherwise, the water pump, the radiator, the deionization device, and the thermostat will be further disassembled and classified according to the material categories for recycling.

Preferably, in step (2), the ashing is carried out at a temperature of 400° C. to 600° C., and lasts for 30 minutes to 60 minutes.

The object of the above ashing is to remove carbon, burn out the carbon cloth and generate carbon dioxide, so that the catalyst can be directly separated from the carbon cloth.

Preferably, in step (3), the auxiliary agent is one of NaF, $CaF_2$, KCl, NaCl or $CaCl_2$.

The above-mentioned auxiliary agent is a solid chlorinating agent, wherein the solid chlorinating agent will be completely or mostly decomposed into a gaseous chlorinating agent such as chlorine gas or HCl during the reaction process and then working, so that the ash will be chlorinated, and enter the ammonium chloride solution with chlorine gas.

Preferably, in step (3), a weight ratio of the ash to the auxiliary agent is 1:1 to 5.

Preferably, in step (3), the inert gas is one of nitrogen, helium or argon gas.

Preferably, in step (3), the oxidizing gas is one of chlorine gas or bromine gas.

Preferably, in step (3), the ammonium salt solution is one of ammonium chloride solution or ammonium bromide solution.

Preferably, in step (3), the inert gas is introduced at a flow rate of 1 $mL·min^{-1}$ to 30 $mL·min^{-1}$, and lasts for 5 minutes to 15 minutes.

Preferably, in step (3), the oxidizing gas is introduced at a flow rate of 1 $mL\ min^{-1}$ to 30 $mL\ min^{-1}$, and lasts for 20 minutes to 60 minutes.

Preferably, in step (3), the ammonium salt solution has a concentration of 1 $mol·L^{-1}$ to 5 $mol·L^{-1}$.

Preferably, in step (3), the temperature is raised to 1,000° C. to 1,200° C. at a rate of 2° $C.·min^{-1}$ to 6° $C.·min^{-1}$.

Preferably, in step (4), the reducing agent is one of sodium thiosulfate, sodium borohydride or hydrazine.

More preferably, in step (4), the reducing agent has a mass concentration of 40% to 100%.

Preferably, in step (4), a volume ratio of the ammonium chloride solution to the reducing agent is 1:(0.1 to 0.3).

Preferably, in step (4), the further purification process of Pt after preparing Pt in step is as follows: adding a leachate into Pt, heating, washing, filtering, taking a filtrate, adding a reducing agent for reaction, filtering, taking and cleaning a filter residue to obtain pure Pt, wherein a mass ratio of Pt to the leachate is 1:(10 to 20).

More preferably, the leachate is aqua regia, and the aqua regia has a mass concentration of 50% to 100%.

Beneficial Effects

1. According to the present invention, the platinum element in the hydrogen fuel cell can be efficiently recycled, the high-purity Pt can be prepared by combining the chlorination evaporation method with the chemical reduction method, the precious metal resources are effectively saved, and the recycling process has the advantages of being easy and convenient to operate and high in production efficiency.

2. The present invention is the first recycling process for the hydrogen fuel cells in China, which can safely separate gas cylinders containing residual fuels and reduce the safety risks of the gas cylinders containing the residual fuels.

3. According to the present invention, all the components of the hydrogen fuel cell are recycled, and some parts can be fully utilized in steps, thus saving the economic cost. In each ton of hydrogen fuel cells, the recycling rate of Pt is 99.7% and the purity of Pt crude product is 99.9%; the recycling rate of Cu is 98.6%, and the recycling rate of Fe is 98.7%; the recycling rate of Zn is 99.5%; the recycling rate of Al is 99.8%; and the recycling rate of plastic is 99.5%.

BRIEF DESCRIPTION OF DRAWINGS

FIG. 1 is a flowchart of a hydrogen fuel cell recycling process according to Embodiment 1 of the present invention.

DETAILED DESCRIPTION

In order to make the technical solutions of the present invention clearer to those skilled in the art, the following embodiments are listed for explanation. It should be noted that the following embodiments do not limit the scope of protection claimed by the present invention.

Unless otherwise specified, the raw materials, reagents or devices used in the following embodiments can be obtained from conventional commercial sources or by existing known methods.

Embodiment 1

A method for recycling a hydrogen fuel cell of a new energy vehicle included the following specific steps of:

(1) discharging a hydrogen fuel cell until a hydrogen fuel in a hydrogen storage tank was completely exhausted, and disassembling the hydrogen fuel cell to obtain a hydrogen supply system, an air supply system, a cooling system, an electric control system and a galvanic pile;

(2) further disassembling the hydrogen supply system to obtain a hydrogen ejector, a high-pressure hydrogen sealing valve, a reducing valve, a hydrogen tank, a hydrogen circulating pump, an inverter, a hydrogen concentration sensor, a hydrogen temperature sensor, a hydrogenation control unit, a hydrogen pressure sensor, and a hydrogen pipeline; further disassembling the air supply system to obtain an air compressor, a muffler, an air valve module, and an air pipeline; and further disassembling the cooling system to obtain a water pump, a radiator, a deionization device, and a thermostat (three-way valve);

(3) further disassembling the galvanic pile to obtain metal fasteners such as a screw stem, alloy bipolar plates and a plastic shell for direct recycling, directly discarding graphite bipolar plates, further disassembling membrane electrodes to directly recover proton exchange membranes as polymers, placing the obtained catalyst and carbon cloth in a ceramic crucible, and ashing the ceramic crucible in a muffle furnace at 400° C. for 30 minutes to obtain ash;

(4) placing the ash in mortar, adding NaF according to a weight ratio of 1:1, grinding the mixture evenly, pouring the mixture into a corundum porcelain boat and then placing the boat in a middle heating zone of a tube furnace, introducing nitrogen at a flow rate of 1 $mL·min^{-1}$, absorbing the tail gas with 30 mL of ammonium chloride solution with a concentration of 1 $mol·L^{-1}$, introducing nitrogen for 5 minutes, then raising the temperature to 1,000° C. at a heating rate of 2° C.·min$^{-1}$, switching to another gas channel to introduce the chlorine gas for 20 minutes, then switching back to the nitrogen again, turning off the heating system, cooling to room temperature, and turning off the chlorine gas;

(5) adding the ammonium chloride solution absorbing the tail gas into sodium thiosulfate solution with a mass concentration of 40% according to a volume ratio of 1:0.1, filtering, cleaning, and taking a filter residue to obtain crude Pt; and (6) adding aqua regia with a mass concentration of 50% into the crude Pt according to a mass ratio of 1:10, heating the mixture to slight boiling for 5 minutes, rinsing the cup wall with 5 mL of deionized water, filtering, taking and adding the filtrate into sodium thiosulfate solution with a mass concentration of 40% according to a volume ratio of 1:0.1, filtering, cleaning, and take a filter residue which was pure Pt.

Embodiment 2

A method for recycling a hydrogen fuel cell of a new energy vehicle included the following specific steps of:

(1) discharging a hydrogen fuel cell until a hydrogen fuel in a hydrogen storage tank was completely exhausted, and disassembling the hydrogen fuel cell to obtain a hydrogen supply system, an air supply system, a cooling system, an electric control system and a galvanic pile;

(2) further disassembling the hydrogen supply system to obtain a hydrogen ejector, a high-pressure hydrogen sealing valve, a reducing valve, a hydrogen tank, a hydrogen circulating pump, an inverter, a hydrogen concentration sensor, a hydrogen temperature sensor, a hydrogenation control unit, a hydrogen pressure sensor, and a hydrogen pipeline; further disassembling the air supply system to obtain an air compressor, a muffler, an air valve module, and an air pipeline; and further disassembling the cooling system to obtain a water pump, a radiator, a deionization device, and a thermostat (three-way valve);

(3) further disassembling the galvanic pile to obtain metal fasteners such as a screw stem, alloy bipolar plates and a plastic shell for direct recycling, directly discarding graphite bipolar plates, further disassembling membrane electrodes to directly recover proton exchange membranes as polymers, placing the obtained catalyst and carbon cloth in a ceramic crucible, and ashing the ceramic crucible in a muffle furnace at 500° C. for 45 minutes to obtain ash;

(4) placing the ash in mortar, adding KCl according to a weight ratio of 1:3, grinding the mixture evenly, pouring the mixture into a corundum porcelain boat and then placing the boat in a middle heating zone of a tube furnace, introducing nitrogen at a flow rate of 15 mL·min$^{-1}$, absorbing the tail gas with 35 mL of ammonium chloride solution with a concentration of 3 mol·L$^{-1}$, introducing nitrogen for 10 minutes, then raising the temperature to 1,100° C. at a heating rate of 4° C.·min$^{-1}$, introducing chlorine gas for 40 minutes, then switching back to the nitrogen again, turning off the heating system, cooling to room temperature, and turning off the chlorine gas;

(5) adding the ammonium chloride solution absorbing the tail gas into sodium borohydride with a mass concentration of 60% according to a volume ratio of 1:0.2, filtering, cleaning, and taking a filter residue to obtain crude Pt; and (6) adding aqua regia with a mass concentration of 75% into the crude Pt according to a mass ratio of 1:15, heating the mixture to slight boiling for 7 minutes, rinsing the cup wall with 7 mL of deionized water, filtering, taking and adding the filtrate into sodium borohydride with a mass concentration of 40% according to a volume ratio of 1:0.1, filtering, cleaning, and take a filter residue which was pure Pt.

Embodiment 3

A method for recycling a hydrogen fuel cell of a new energy vehicle included the following specific steps of:

(1) discharging a hydrogen fuel cell until a hydrogen fuel in a hydrogen storage tank was completely exhausted, and disassembling the hydrogen fuel cell to obtain a hydrogen supply system, an air supply system, a cooling system, an electric control system and a galvanic pile;

(2) further disassembling the hydrogen supply system to obtain a hydrogen ejector, a high-pressure hydrogen sealing valve, a reducing valve, a hydrogen tank, a hydrogen circulating pump, an inverter, a hydrogen concentration sensor, a hydrogen temperature sensor, a hydrogenation control unit, a hydrogen pressure sensor, and a hydrogen pipeline; further disassembling the air supply system to obtain an air compressor, a muffler, an air valve module, and an air pipeline; and further disassembling the cooling system to obtain a water pump, a radiator, a deionization device, and a thermostat (three-way valve);

(3) further disassembling the galvanic pile to obtain metal fasteners such as a screw stem, alloy bipolar plates and a plastic shell for direct recycling, directly discarding graphite bipolar plates, further disassembling membrane electrodes to directly recover proton exchange membranes as polymers, placing the obtained catalyst and carbon cloth in a ceramic crucible, and ashing the ceramic crucible in a muffle furnace at 600° C. for 60 minutes to obtain ash;

(4) placing the ash in mortar, adding NaCl according to a weight ratio of 1:5, grinding the mixture evenly, pouring the mixture into a corundum porcelain boat and then placing the boat in a middle heating zone of a tube furnace, introducing nitrogen at a flow rate of 30 mL·min$^{-1}$, absorbing the tail gas with 40 mL of ammonium chloride solution with a concentration of 5 mol·L$^{-1}$, introducing nitrogen for 15 minutes, then raising the temperature to 1,200° C. at a heating rate of 6° C.·min$^{-1}$, introducing chlorine gas for 60 minutes, then switching back to the nitrogen again, turning off the heating system, cooling to room temperature, and turning off the chlorine gas;

(5) adding the ammonium chloride solution absorbing the tail gas into hydrazine with a mass concentration of 100% according to a volume ratio of 1:0.3, filtering, cleaning, and taking a filter residue to obtain crude Pt; and (6) adding aqua regia with a mass concentration 100% into the crude Pt according to a mass ratio of 1:20, heating the mixture to slight boiling for 10 minutes, rinsing the cup wall with 10 mL of deionized water, filtering, taking and adding the filtrate into hydrazine with a mass concentration of 100% according to a volume ratio of 1:0.3, filtering, cleaning, and take a filter residue which was pure Pt.

Comparative Example 1 (CN104745836A)

A platinum recycling refining process included the following process steps of:

a. carbonizing a platinum-containing material for 1.5 hours to 2.5 hours at 750° C. to 850° C.;

b. cooling to a room temperature and then adding aqua regia to dissolve the material at a temperature control between 65° C. and 75° C. until the material was completely dissolved;

c. adding ammonium chloride and precipitating for 0.5 hour to 1.5 hours, and after precipitating, filtering and washing ammonium chloroplatinate;

d. adding sodium hydroxide till dissolving in 20 minutes to 40 minutes to form a dissolution solution;

e. heating the dissolution solution obtained in the step d to 45° C. to 55° C. and then adding hydrazine hydrate for reducing, and reacting for 0.5 hour to 1.5 hours to finish platinum recycling; and f. drying the reduced platinum powder.

Recycling efficiency:

TABLE 1

Recycling status and cost of Embodiment 2

| Recycling object | Recycling rate (%) | Recycling amount (per ton of battery) | Crude product purity (%) | Process cost (RMB) |
|---|---|---|---|---|
| Pt | 99.7 | 60.56 g | 99.9 | 231 |
| Cu | 98.6 | 82.62 kg | 99.6 | 36 |
| Fe | 98.7 | 636.5 kg | 98.7 | 23 |
| Zn | 99.5 | 1.2 kg | 99.5 | 103 |
| Al | 99.8 | 160.9 kg | 99.8 | 41 |
| Plastic | 99.5 | 67.0 kg | 99.2 | 37 |

TABLE 2

Recycling status and cost of Embodiment 3

| Recycling object | Recycling rate (%) | Recycling amount (per ton of battery) | Crude product purity (%) | Process cost (RMB) |
|---|---|---|---|---|
| Pt | 99.3 | 58.36 g | 99.8 | 246 |
| Cu | 98.5 | 81.99 kg | 99.4 | 42 |
| Fe | 98.6 | 631.7 kg | 98.5 | 29 |
| Zn | 99.2 | 1.13 kg | 99.3 | 125 |
| Al | 99.5 | 159.6 kg | 99.5 | 44 |
| Plastic | 99.3 | 65.8 kg | 99.1 | 39 |

TABLE 2

Recycling status and cost of Comparative Example 1

| Recycling object | Recycling rate (%) | Recycling amount (per ton of battery) | Crude product purity (%) | Process cost (RMB) |
|---|---|---|---|---|
| Pt | 96.7 | 57.56 g | 99.8 | 588 |
| Cu | 97.6 | 76.62 kg | 99.1 | 43 |
| Fe | 95.7 | 616.5 kg | 98.2 | 35 |
| Zn | 96.5 | 1.1 kg | 99.3 | 121 |
| Al | 97.8 | 155.9 kg | 98.8 | 57 |
| Plastic | 96.5 | 65.0 kg | 97.2 | 42 |

It can be seen from Tables 1 to 3 that, in each ton of hydrogen fuel cell, the recycling rate of Pt in Embodiment 2 of the present invention is 99.7%, and the purity of the Pt crude product is 99.9%; the recycling rate of Cu is 98.6%, and the purity of the Cu crude product is 99.6%; the recycling rate of Fe is 98.7%, and the purity of the Fe crude product is 98.7%; the recycling rate of Zn is 99.5%, and the purity of the Zn crude product is 99.5%; the recycling rate of Al is 99.8%, and the purity of the Al crude product is 99.8%; and the recycling rate of plastic is 99.5%, and the purity of the Pt crude product is 99.2%. In each ton of hydrogen fuel cell, the recycling rate of Pt in Embodiment 3 of the present invention is 99.3%, and the purity of the Pt crude product is 99.8%; the recycling rate of Cu is 98.5%, and the purity of the Cu crude product is 99.4%; the recycling rate of Fe is 98.6%, and the purity of the Fe crude product is 98.5%; the recycling rate of Zn is 99.2%, and the purity of the Zn crude product is 99.3%; the recycling rate of Al is 99.5%, and the purity of the Al crude product is 99.5%; and the recycling rate of plastic is 99.3%, and the purity of the Pt crude product is 99.1%. In the Comparative Example 2, the recycling rate of Pt is 96.7%, the recycling rate of Cu is 97.6%, the recycling rate of Fe is 95.7%, the recycling rate of Zn is 96.5%, the recycling rate of Al is 97.8%, and the recycling rate of plastic is 96.5%, respectively. The recycling rates of all components are lower than those in Embodiments 2 and 3, and the process cost of recycling Pt is much higher than that in Embodiment 2. From this, it can be seen that by using the method for recycling of the present invention, the process for obtaining pure platinum is simple, low in cost, and industrially recoverable.

FIG. 1 is a flowchart of a waste hydrogen fuel cell recycling process according to Embodiment 1 of the present invention. It can be seen from FIG. 1 that the entire recycling process is simple and efficient. The recycling range includes materials with a specific gravity of more than 99% and can obtain crude products with higher purity. The difficulty in the whole process is the method for recycling platinum. The ashing treatment can directly increase the purity of platinum to more than 98%. After two steps of high temperature chlorination and reduction, the platinum can be purified, and the purity can reach 99.9%.

The method for recycling the hydrogen fuel cell of the new energy vehicle provided by the present invention has been introduced in detail above, and the principle and implementation of the present invention have been illustrated with specific embodiments. The explanation of the above embodiments is only used to help understand the method and the core idea of the present invention, including the best mode, and also enables any person skilled in the art to practice the present invention, including manufacturing and using any device or system, and implementing any combined method. It should be pointed out that for those of ordinary skills in the art, several improvements and modifications can be made to the present invention without departing from the principle of the present invention, and these improvements and modifications also fall within the protection scope of the claims of the present invention. The protection scope of the present invention is defined by the claims, and may include other embodiments that can be thought of by those skilled in the art. If these other embodiments have structural elements that are not different from the literal expression of the claims, or if they include equivalent structural elements that are not materially different from the literal expression of the claims, these other embodiments should

The invention claimed is:

1. A method for recycling a hydrogen fuel cell, comprising:
   (1) discharging and disassembling a hydrogen fuel cell to obtain a hydrogen supply system, an air supply system, a cooling system and a galvanic pile;
   (2) disassembling the galvanic pile into a catalyst and carbon cloth, and ashing to obtain ash;
   (3) adding an auxiliary agent into the ash, mixing, introducing inert gas, heating, introducing oxidizing gas, and absorbing tail gas by using an ammonium salt solution; and (4) adding a reducing agent into the ammonium salt solution absorbing the tail gas in step (3) to react, filtering, taking and cleaning a filter residue to obtain Pt;

wherein in step (3), the auxiliary agent is one of NaF, $CaF_2$, KCl, NaCl, or $CaCl_2$.

2. The method of claim 1, wherein in step (2), the ashing is carried out at a temperature of 400° C. to 600° C., and lasts for 30 minutes to 60 minutes.

3. The method of claim 1, wherein in step (3), the oxidizing gas is one of chlorine gas or bromine gas.

4. The method of claim 1, wherein in step (3), the oxidizing gas is one of nitrogen, helium or argon.

5. The method of claim 1, wherein in step (3), the heating is carried out at a rate of $2° C.\cdot min^{-1}$ to $6° C.\cdot min^{-1}$ and a temperature of 1,000° C. to 1,200° C.

6. The method of claim 1, wherein in step (4), the reducing agent is one of sodium thiosulfate, sodium borohydride or hydrazine.

7. The method of claim 1, wherein in step (4), the ammonium salt solution is one of ammonium chloride solution or ammonium bromide solution.

8. The method of claim 1, wherein in step (4), a further purification process of Pt after preparing Pt is as follows: adding a leachate into Pt, heating, washing, filtering, taking a filtrate, adding a reducing agent for reaction, filtering, taking and cleaning a filter residue to obtain pure Pt, wherein a mass ratio of Pt to the leachate is 1:(10 to 20).

9. The method of claim 8, wherein the leachate is aqua regia, and the aqua regia has a mass concentration of 50% to 100%.

\* \* \* \* \*